United States Patent
Ellis

(10) Patent No.: US 7,346,060 B1
(45) Date of Patent: Mar. 18, 2008

(54) AAL-2 SWITCHED VOICE WAN NETWORKING

(75) Inventor: John G. Ellis, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/507,236

(22) Filed: Feb. 18, 2000

(51) Int. Cl.
*H04L 12/28* (2006.01)
*H04L 12/56* (2006.01)

(52) U.S. Cl. .............................. 370/395.3; 370/395.64; 370/400

(58) Field of Classification Search ............. 370/395.1, 370/395.3, 395.31, 395.43, 395.5, 395.52, 370/395.6, 397, 409, 410, 351–352, 384, 370/400–401, 396–399, 395.2, 39.61, 395.64
See application file for complete search history.

(56) References Cited

U.S. PATENT DOCUMENTS

| | | | |
|---|---|---|---|
| 5,953,339 A * | 9/1999 | Baldwin et al. ............ | 370/397 |
| 6,449,276 B1 * | 9/2002 | Subbiah et al. .......... | 370/395.6 |
| 6,490,245 B2 * | 12/2002 | Burns et al. ................ | 370/216 |
| 6,496,508 B1 * | 12/2002 | Breuckheimer et al. .... | 370/397 |
| 6,519,261 B1 * | 2/2003 | Brueckheimer et al. ...................... | 370/395.52 |
| 6,665,300 B1 * | 12/2003 | Caves et al. ............. | 370/395.2 |
| 6,683,877 B1 * | 1/2004 | Gibbs et al. ............. | 370/395.2 |
| 7,092,384 B1 * | 8/2006 | Ramaswamy et al. ...... | 370/352 |

OTHER PUBLICATIONS

"ATM Trucking using AAL2 for Narrowband Services", The ATM Forum Technical Committee, AF-VTOA-0113.000 Final Ballot, Jan. 1999, p. 1-52.

Bellcore, G. Ratta, Chief Editor, ATM User-Network Interface, Version 3.1 (UNI 3.1) Specification, The ATM Forum, Draft of May 28, 1994, p. I-68.

"Broadband Integrated Services Digital Network (B-ISDN)—Digital Subscriber Signaling System No. 2 (DSS 2)—User-Network Interface (UNI) Layer 3 Specification For Basic call/Connection Control", ITU-T Telecommunication standardization Sector of ITU, B-ISDN Application Protocols For Access Signaling, ITU-T Recommendation Q.2931 (Feb. 1995), p. 1-249.

The ATM Forum Technical Committee, "ATM User-Network Interface (UNI) Signaling Specification, Version 4.0," af-sig-0061.000, pp. li-129 (Jul. 1996).

The ATM Forum Technical Committee, "Addendum to UNI Signalling V4.0 for ABR Parameter Negotiation," af-sig-0076.000, pp. 1-3 (Jan. 1997).

The ATM Forum Technical Committee, "ATM User-Network Interface (UNI) Signaling Specification, Version 4.1," With Revision Marks Relative to af-sig-0061.000, XP002247682, ATM Forum document number af-sig-0061.001 (Apr. 2002).

(Continued)

*Primary Examiner*—Joseph Feild
*Assistant Examiner*—Inder Pal Mehra
(74) *Attorney, Agent, or Firm*—Blakely, Sokoloff, Taylor & Zafman LLP

(57) ABSTRACT

A scheme for using a virtual UNI (user network interface) to allow standards-based signaling protocols (e.g., Q.2931) to be used to manage the addition and deletion of AAL2 channel identifiers (CIDS) associated with sub-multiplexed AAL2 common part sub-layer cells is described herein. An ATM node is configured to dynamically establish ATM adaptation layer 2 (AAL2) channel identifiers (CIDS) on a call-by-call basis using standards-based call control signaling protocols mapping CIDs to a virtual path/virtual channel (VP/VC) within an ATM standard call control protocol.

16 Claims, 3 Drawing Sheets

OTHER PUBLICATIONS

Fore Systems, "7.1 Virtual UNI," 4 pages (1999).

Mike McLoughlin, et al., "A Management Briefing on Adapting Voice For ATM networks an AAL2 Tutorial," General DataComm, 17 pages (1997).

"AAL2 (ATM Adaptation Layer2)," 5 pages.

ITU-T Telecommunication Standardization Sector of ITU, I.366.2, Series I: Integrated Services Digital Network Overall Network Aspects and functions - Protocol Layer requirements, AAL type 2 service specific convergence sublayer for trunking, pp. i-vii and 12 (Feb. 1999).

"Telecom Protocol Finder; Chapter 3: ATM Signalling and Routing Protocols," pp. 43-70 (Jun. 2001).

U.S. Appl. No. 60/120,174, filed Feb. 16, 1999. Oct. 12, 2007.

"CAS—A Novice Guide," http://www.pulsewan.com/data101//cas_basics. htm, 5 pgs., (2002)

R. Kumar, et al., "Conventions for the use of the Session Description Protocol (SDP) for ATM Bearer Connections," Request for Comments: 3108, http://zvon.org/tmRFC/RFC3108/Output/index.html, pp. 1-110 (May 2001).

Mark Baugher, et al., SDP Security Descriptions for Media Streams, draft-ietf-mmusic-sdescriptions.00.txt, Seminar, 15 pages.

International Telecommunication Union (ITU), ITU-T, Q.2931. B-ISDN Application Protocols for Access Signalling, pp. I-iv, and 1-249 (Feb. 1995).

Harry Newton, "Virtual Private Network (VPN)," Newton's Telecom Dictionary, Updated 15th Expanded Edition, pp. 858-859 (Feb. 1999).

* cited by examiner

AAL-2 SWITCHED VOICE WAN NETWORKING

FIELD OF THE INVENTION

The present invention relates generally to the field of cell switching network communications and, more specifically, to a scheme for providing virtual user-network interfaces (UNIs) to allow standards-based signaling protocols for such networks to be used to manage the addition and deletion of AAL2 channel identifiers (CIDs) associated with sub-multiplexed AAL2 common part sublayer cells and to allow for interoperability with regular ATM networks.

BACKGROUND

The desire to integrate data, voice, image and video over high-speed digital trunks has led to the development of a variety of packet and cell switching techniques. One such technique is called Asynchronous Transfer Mode (ATM). ATM is a switching technology that provides users with the ability to connect to one or more users in a transparent fashion. Unlike the variable length packets used by frame relay services, ATM service is based on switching fixed length packets of data known as cells. Cell switching, as it is called, is gaining popularity for a variety of reasons. First, switch architectures can be optimized to switch cells at much higher speeds than variable length packets. Second, multiple services requiring a variety of qualities of service guarantees can be provided simultaneously. ATM user traffic is first segmented into fixed length cells, transmitted, then reassembled back into its original form. This segmentation and reassembly (SAR) process is done in a standardized way, regardless of the carrier providing the ATM service.

Although the use of fixed length cells in ATM can be efficient in terms of allowing standardized switching apparatus to be used, for many applications the standard 53-byte cell provides too large a package for the data (e.g., compressed voice) requiring transport through the network. As a result, much of the cell payload is merely "padding" and the transport of such padding wastes the available bandwidth of the ATM network. Several approaches to solve this problem present themselves.

For example, one could use a shorter length cell. As indicated, ATM uses a standard 53-byte cell, with 48-bytes of payload and 5-bytes of header information. Choosing a smaller cell size could result in less of the cell payload being filled by padding. However, shorter cells have two important disadvantages. First, such cells would be non-standard and, as a result, such cells could not be transported through ATM networks designed to accommodate only standard size cells. This lack of interoperability would likely mean that users would be disinclined to accept such a solution. Second, smaller cells would likely end up wasting more bandwidth than they would save because the ratio of header size to payload is much higher than for a 53-byte cell. Unfortunately, the header size could probably not be reduced from the current 5-byte size without a loss of functionality.

Another solution might be to use variable length packets, as is common in frame relay networks. This could conceivably avoid the need for padding altogether because packets could be "custom built" to the requirements of the user data. Unfortunately, the very fact that such varying packet sizes are allowed within frame relay networks means that the switches used to transport the packets across the network must be more complex than their ATM counterparts. As a result, such switches are generally slower than ATM switches. Further, in networks where variable length packets are used, it is difficult to make real time service guarantees without the use of complex servicing and queuing algorithms and some limitations on packet size.

Yet another solution might be to pack multiple payloads into one cell at a source and then pull these payloads apart at a destination. The ATM Forum has promulgated a standard regarding such bundling of data channels within a single cell, entitled "ATM Trunking Using AAL2 for Narrowband Services", AF-VOTA-0113.000 (February 1999), which is incorporated herein by reference. AAL2 (ATM Adaptation Layer type 2) provides a standards-based approach for multiplexing multiple voice channels on a single virtual circuit (VC) between two points. Thus, it provides for conserving bandwidth where the use of standard ATM cells might be wasteful. For this reason, AAL2 is a desirable solution for bringing ATM service to customer premises.

However, carriers wishing to bring such services up to the customer premises face other challenges. For example, existing ATM hardware (e.g., switches and the like) cannot accommodate the sub-multiplexed packets that make up an AAL2 cell. Furthermore, the installed base of signaling protocols (i.e., the process by which ATM users and the network exchange control information, request the use of network resources, or negotiate for the use of circuit parameters) are designed for use with 53-byte ATM cells and will not readily accommodate multiple AAL2 sub-cells. Accordingly, what is needed is a scheme for allowing the use of switched AAL2 up to the customer premises using a protocol set for networking the AAL2 connections which is fully consistent with those that are used to manage connection set ups across a regular ATM network.

SUMMARY OF THE INVENTION

An ATM node is configured to dynamically establish ATM adaptation layer 2 (AAL2) channel identifiers (CIDs) on a call-by-call basis using standards-based call control signaling protocols mapping CIDs to a virtual path/virtual channel (VP/VC) within an ATM standard call control protocol.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
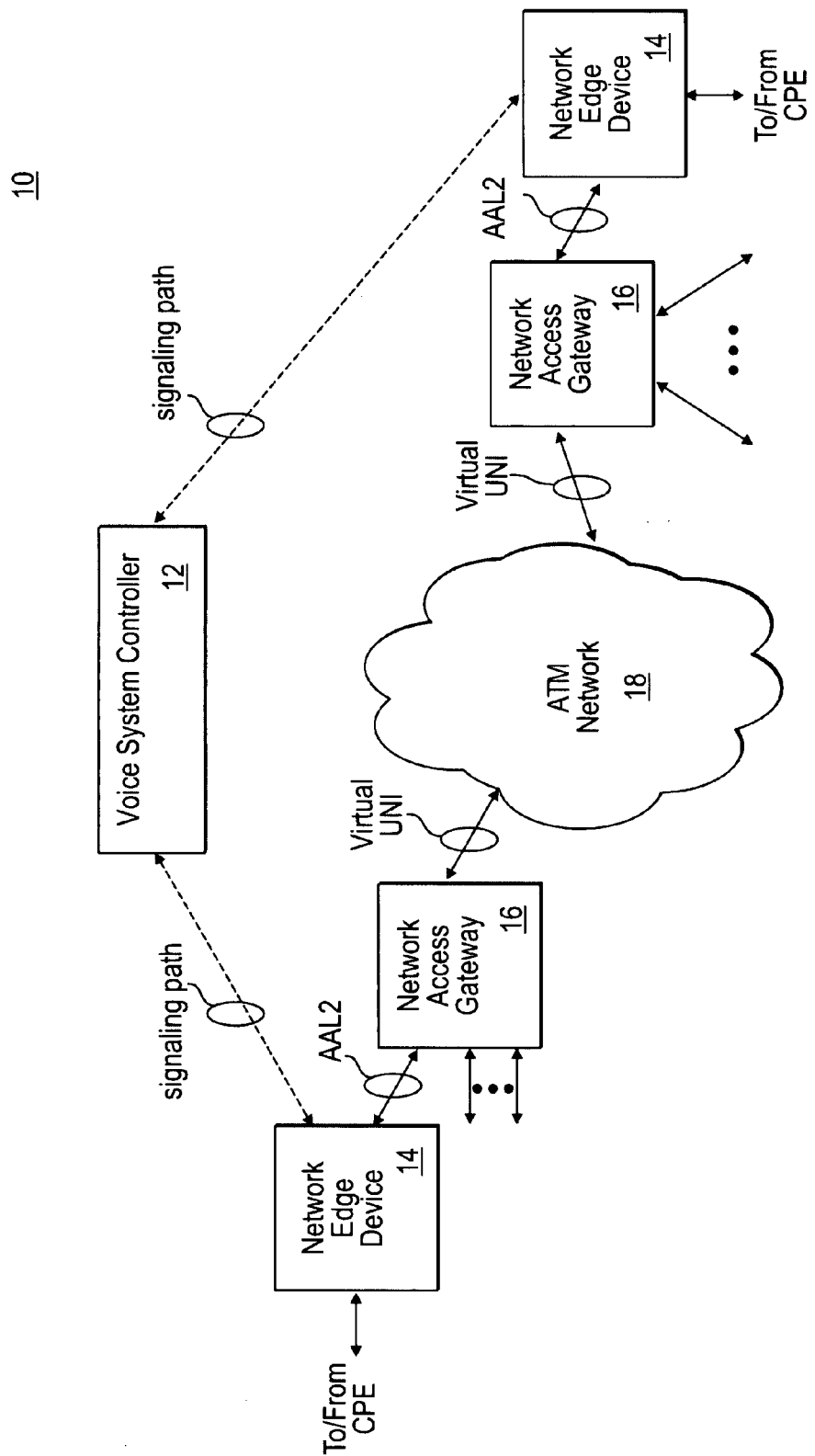
FIG. 1 illustrates an example of the use of AAL2 communication paths at the edges of an ATM network in accordance with an embodiment of the present invention.

A scheme for using a virtual UNI (user network interface) to allow standards-based signaling protocols (e.g., Q.2931) to be used to manage the addition and deletion of AAL2 channel identifiers (CIDs) associated with sub-multiplexed AAL2 common part sublayer cells (sub-cells) is described herein. The present scheme may also be adapted for use with other data communication schemes, such as frame relay or voice over IP (Internet Protocol). Therefore, although in the following description the present invention will be described with reference to specific exemplary embodiments thereof, it should be kept in mind that various modifications and changes may be made thereto without departing from the broader spirit and scope of the invention as set forth in the appended claims.

As mentioned above, AAL2 provides a standards-based method of efficiently carrying small voice packets, of varying size, over an ATM VCC (virtual channel connection) using a sub-multiplexing system addressing scheme. Carriers now face the problem of designing end-to-end switched voice solutions based on an ATM PNNI (private network to network interface) core network and ATM switching fabrics designed to handle the standard 53-byte cells, while still making use of the AAL2 multiplexing protocol to gain bandwidth efficiencies over CPE (customer premises equipment)-to-network communication links. The present scheme allows for such implementations by providing an algorithmic mapping between the VP/VC (virtual path/virtual circuit) that is referenced (e.g., in a cell header) in standards-based Q.2931/UNI protocols to the CID of sub-multiplexed cells within an AAL2 stream. Through this mechanism, it is possible to provide an end-to-end switched voice network service using PNNI or any other standard ATM networking protocol to establish end-to-end voice connectivity. This same concept can be extended to support frame relay or Internet protocol network connections to an ATM PNNI network.

In order to more fully appreciate the advantages offered by the present scheme, some background is helpful. For example, much of the following discussion will make reference to the use of standards-based ATM signaling protocols. Signaling is the process by which ATM users and an ATM network exchange control information, request the use of network resources, or negotiate for the use of circuit parameters. Some protocols support so-called connection control signaling. In these schemes, messages are sent over a Signaling ATM Adaptation Layer (SAAL), which ensures their reliable delivery. The SAAL is divided into a Service Specific Part and a Common Part. The Service Specific Part is further divided into a Service Specific Coordination Function (SSCF), which interfaces with the SSCF user; and a Service Specific Connection-Oriented Protocol (SSCOP), which assures reliable delivery.

The UNI signaling protocols within the SAAL are responsible for ATM call and connection control, including call establishment, call clearing, status enquiry, and point-to-multipoint control. A signaling message is sent in a standard message format and is made up of a message header and a variable number of Information Elements (IEs) in its payload. The message header includes a protocol discriminator (to identify the signaling protocol being used) along with identifying information for the message type (of which there are several) and length.

One particular standards-based signaling protocol is based on Recommendation Q.2931, promulgated by the International Telecommunications Union (ITU). Although this protocol will be referred to throughout, it should be understood that other protocols, and in particular the UNI 3.1/4.0 as promulgated by the ATM Forum, may also be used. Therefore, this specification should be read as including UNI 3.1/4.0 wherever Q.2931 is referenced.

The Q.2931 signaling protocol specifies the procedures for the establishment, maintenance and clearing of network connections at the B-ISDN (broadband integrated services digital network) user network interface. The procedures are defined in terms of messages exchanged and the basic capabilities supported by Q.2931 signaling include switched virtual channel (SVC) connections, point-to-point switched channel connections, and VCI (virtual channel identifier) negotiation. Q.2931 cells include a "call reference" field, which is a unique number for every ATM connection that serves to link all signaling messages relating to the same connection. It also identifies the call at the local user network interface to which the particular message applies.

Returning now to the present scheme, call set up at the CPE may be allowed to occur through the signaling process normally associated with the standards-based protocol (e.g., Q.2931 or UNI 3.1/4.0) in use. For example, and referring to FIG. 1, a network 10 may be dynamically established with a voice system controller (VSC) 12. The VSC 12, in conjunction with a PNNI/SVC network, is responsible for translating call request based on dialed digits and selecting a specific output voice port. This information is used by the voice end point to make an SVC connection set up request into the ATM network 18. The VSC 12 determines the destination end point. The ATM network 18 is responsible for establishing the connection. Typically in this type of networking the actual ATM connection is made from the destination back to the actual origination port.

The end-points may include network edge devices 14 that communicate with traditional time division multiplexed (TDM) CPE and provide TDM-to-AAL2 conversion in accordance with the relevant ATM Forum standards for such processes. Based on a call request from one of these network edge devices 14, the VSC determines the ATM address (e.g., an NASP address) of the origination device (e.g., through a look-up process to access a cache or by querying the network or the edge device) and provides this information to the destination network edge device. In addition, the origination network edge device selects, as part of the connection set up message, a VC and available CID within this VC for the call and provides this information with its ATM address in the connection request message. At this point, call connection is complete. The call tear down process follows a similar protocol between the network edge devices 14 and the VSC 12.

Although ATM AAL2 is used at the network edges, e.g., between network edge devices 14 and network access gateways 16, conventional ATM and PNNI networking (e.g., using 53-byte cells) is used within the core ATM network 18. Although the transport of compressed voice within the core may, therefore, be somewhat wasteful of bandwidth, this bandwidth is relatively plentiful and inexpensive as compared to the available bandwidth outside core ATM network 18. Furthermore, the need for functional flexibility within the core network 18 outweighs the desire for bandwidth savings that might be achieved using AAL2. Thus, the network access gateways 16 will be responsible for demultiplexing the AAL2 streams to conventional ATM cells and for mapping these streams to a VP/VC associated with the call. Because the gateways 16 provide this mapping, the switched connection across the core ATM network 18 can be performed using ATM switching and standards-based PNNI SVC networking, which is well known in the art. VSC 12 is involved only at the network edge and manages the voice gateway function between the CPE (e.g., TDM voice switches) and the ATM network 18.

Figure 2:
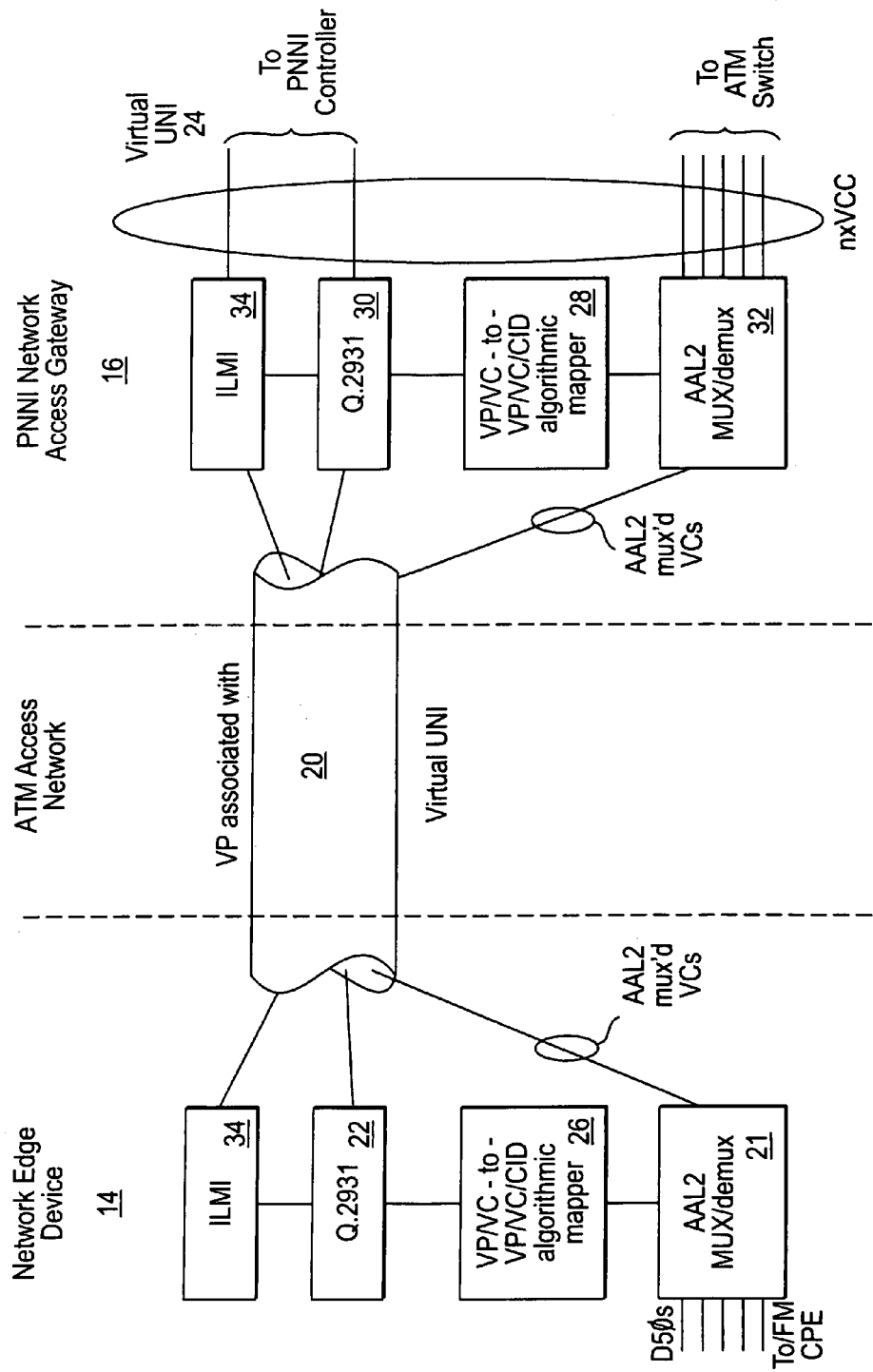
FIG. 2 illustrates an example of the establishment of a virtual UNI at the edge of an ATM network by demultiplexing AAL2 payloads using an ATM standard connection management protocol mapping the CID identifier into the connection reference field of the protocol in accordance with an embodiment of the present invention.

Turning now to FIG. 2, further details of the functions performed at network edge device 14 and network access gateway 16 can be explored. These two entities are communicatively coupled through a virtual path (VP) 20 as shown. This VP 20 carries not only the multiplexed AAL2 cells, but also the signaling information (e.g., formatted in accordance with the Q.2931 standard or another signaling protocol) and network management information 34 (formatted in accordance with the well known Interim Local Management Interface (ILMI) or Local Management Interface (LMI) protocols). The network management interface 34 provides a mechanism to allow for, among other things, network address prefix exchange.

At the network edge device 14, incoming voice information from the channels (e.g., DS0s) associated with the CPE are multiplexed to form AAL2 cells by a multiplexing function 21. Signaling block 22 provides the call set up processes and this process resembles the typical call set up for a UNI SVC (switched virtual circuit), which is a well-known procedure in the art. Unlike the typical UNI SVC call set up process, however, the present scheme maps (in a manner transparent to the signaling software) the VP/VC associated with a virtual UNI port 24 to a CID on the designated AAL2 VCC that forms part of the virtual UNI virtual path 20. This mapping is performed using a mapping function 26. One example of such a mapping function is as follows:

Type 2 CPS

| Voice Port No. | VPI/VCI | CID |
| --- | --- | --- |
| 1 | 0/32 | 8 |
| 2 | 0/33 | 9 |
| 3 | 0/34 | 10 |
| . | . | . |
| . | . | . |
| . | . | . |
| 255 | 0/287 | 255 |

Type 3 (e.g., where all Type ⅔ AAL2 cells are mapped to the same VCI)

| Protocol | VPI/VCI | CID/UUI |
| --- | --- | --- |
| ILMI | 0/16 | 1/16 |
| Signalling Channel | 0/5 | 1/17 |

The access point 16 to the ATM network is determined to be the point at which the composite AAL2 stream is demultiplexed into a number of VCCs. Each VCC maps directly to a CID identifier associated with a common part sublayer (CPS) voice payload using a reverse mapper 28. The reverse mapper 28 receives the VP/VC-to-CID mapping information from the signaling block 30 and using this information the demultiplexer 32 demultiplexes the AAL2 stream into multiple ATM VP/VCs. One voice channel is carried per VCC.

The functional blocks described above also provide reverse operation for duplex communication. For example, blocks 21 and 32 each provide multiplexing and demultiplexing operations for the AAL2 cells. Further, the functions provided by the mapping blocks 26 and 28 are bi-directional, allowing mappings both to and from the AAL2 streams. Further, the signaling units 22 and 30 and network management interface blocks 34 are fully bi-directional.

Furthermore, the functionality provided by each of these blocks may be implemented in hardware, software or a combination of both. For example, a general-purpose processor may be programmed to perform these functions. Thus, the functions may be embodied as computer readable instructions stored or otherwise recorded on a computer readable medium, such as a memory, disk drive or CD-ROM. In other embodiments, application specific integrated circuits (ASICs) and/or specially programmed field programmable gate arrays (FPGAs) or the like may be used. Thus, the functionality may be embodied in so-called firmware, to be loaded when the associated component is booted up.

To the PNNI controller associated with the core ATM network 18, the output of the demultiplexed AAL2 stream and the signaling channel present a Virtual UNI 24 to the core network. In some cases, this combination may map directly to a pure ATM SVC-controlled virtual interface. The PNNI controller may then establish connections across the network 18 using conventional PNNI networking protocols in the same way that a network connection would be established for any other ATM connection.

In addition to providing a method for managing the addition and deletion of CIDs, the present scheme also provides further benefits. For example, when applied to an ATM network using ATM cell switching, the associated PNNI networking and Q.2931/UNI 3.1/4.0 call control, the present protocol to manage CIDs is consistent with protocols used in the remainder of the network. The higher level protocols that sit on top of the signaling layer (e.g., a voice switching application, etc.) and the controllers that are used to provide address resolution operate in exactly the same fashion with the present mechanism as they would in a conventional ATM cell switched network.

Figure 3:
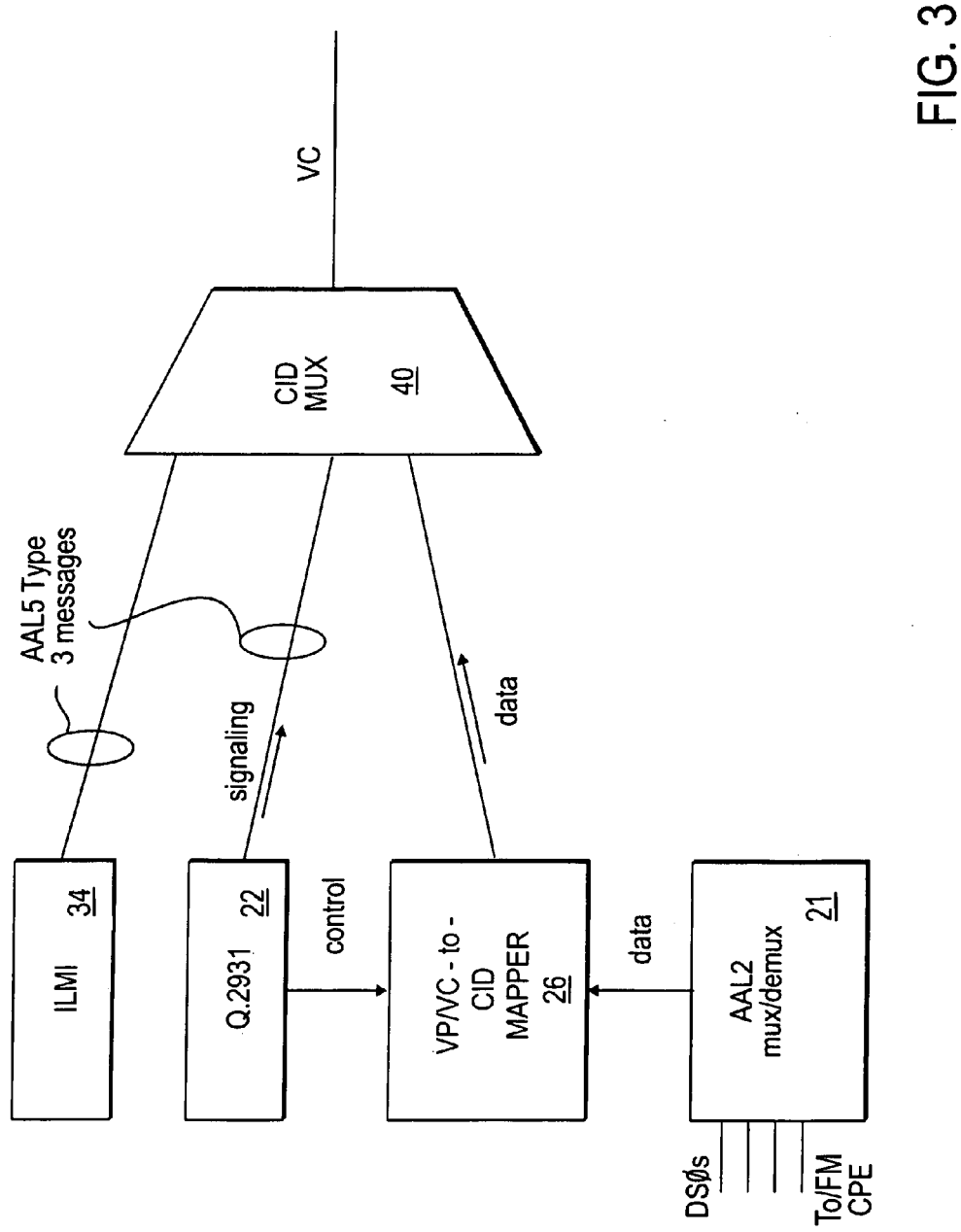
FIG. 3 illustrates an example of mapping signaling, control and AAL2 sub-cell payloads onto a signal VC in accordance with an embodiment of the present invention.

Thus, a scheme for using a Virtual UNI to allow standards-based signaling protocols to be used to manage the additional and deletion of AAL2 CIDs associated with sub-multiplexed AAL2 cells has been described. In the foregoing specification, the invention has been described with reference to specific exemplary embodiments thereof. It will, however, be clear that various modifications and changes may be made thereto without departing from the broader spirit and scope of the invention as set forth in the appended claims. For example, in addition to using a Virtual UNI, it is possible to map all signaling, control and/or AAL2 sub-cell payloads into a signal VC as shown in FIG. 3. The AAL2 multiplexer/demultiplexer 21, VP/VC-to-CID mapper 26, Q.2931 signaling block 22 and ILMI interface block 34 operate in the fashion discussed above. Data is passed to the CID multiplexer 40 from the VP/VC-to-CID mapper 26 using Type 2 messages. Signaling and network management messages are passed from the signaling block 22 and interface block 34, respectively, using AAL5 Type 3 messages. The CID multiplexer 40 may than multiplex these messages onto a signal VC, the ILMI and Q.2931 messages being carried within the AAL2 VC using the Frame mode service as defined in ITU Recommendation I.366.2, section 8.3. The specification and drawings are, accordingly, to be regarded in an illustrative rather than a restrictive sense.

What is claimed is:
1. A method comprising:
   dynamically establishing a plurality of ATM adaptation layer 2 (AAL2) channel identifiers (CIDs) on a call-by-call basis using an ATM standards-based call control signaling protocol by mapping each of the CIDs, for submultiplexed cells that will be within an AAL2 stream in a single virtual channel connection, VCC, that connects a network edge device to a network access gateway, to a respective virtual path/virtual channel (VP/VC) within a virtual user network interface (UNI) of the protocol and wherein during call set-up, each of the plurality of CIDs is individually set up and signaled as the respective VP/VC within a virtual UNI.

2. The method of claim 1 wherein the standards-based ATM call control protocol is selected from the group consisting of Q.2931, UNI 3.0, UNI 4.0, and UNI 4.1.

3. A method comprising mapping a plurality of ATM adaptation layer 2 (AAL2) channel identifiers (CIDs) of a plurality of channels that will be within an AAL2 stream in a single virtual channel connection (VCC), to a plurality virtual path/virtual channel (VP/VC), respectively, within a user network interface, UNI, of a standards-based ATM call control protocol and wherein, during call set-up, each of the plurality of CIDs is individually set up and signaled as a respective one of the plurality of VP/VC, within the UNI.

4. The method of claim 3 wherein the standards-based ATM call control protocol is selected from the group consisting of Q.2931, UNI 3.0, UNI 4.0, and UNI 4.1.

5. The method of claim 3 wherein the mapping is performed at a network edge device communicatively coupled to customer premises equipment.

6. The method of claim 5 wherein the network edge device is communicatively coupled to the customer premises equipment over time division multiplexed communication channels.

7. The method of claim 6 further comprising multiplexing the time division multiplexed communication channels to one or more AAL2 VPs/VCs.

8. The method of claim 3 wherein the CIDs are mapped into connection reference fields of the protocol.

9. Computer-readable instructions, which when implemented by a processor, cause the processor to provide end to end switched virtual circuit voice service over a core ATM network, network access gateways to said core ATM network, and network edge devices that convert between voice channels and AAL2 streams, the latter used to communicate with one of the gateways, by configuring an originating network edge device to set up a call with a destination network edge device using an ATM Forum promulgated signaling protocol that specifies procedures for establishing, maintaining, and clearing network connections, and wherein the originating network edge device maps a respective virtual path identifier/virtual circuit identifier (VPI/VCI) within a virtual user network interface that is referenced in a cell header in accordance with the ATM forum promulgated signaling protocol, to each of a plurality AAL2 channel identifiers (CIDs) of a stream of AAL2 sub-cells in a single virtual channel connection (VCC) and wherein each of the plurality of CIDs is individually set up and signaled as the respective VPI/VCI formatted in accordance with said ATM Forum promulgated signaling protocol, to said one of the network access gateways.

10. The computer-readable instructions of claim 9, wherein the computer-readable instructions are embodied in a computer readable medium and the signaling protocol is selected from the group consisting of Q.2931, UNI 3.0, UNI 4.0, and UNI 4.1.

11. The computer-readable instructions of claim 9 further comprising additional instructions, which when implemented by the processor, cause the processor to multiplex a plurality of time division multiplexed communication channels from customer premises equipment, to a plurality of AAL2 VPs/VCs prior to mapping the CID to the respective VPI/VCI.

12. A network edge device comprising:
  means for receiving voice information from channels associated with customer premises equipment;
  means for multiplexing the received voice information into AAL2 cells;
  means for setting up a switched virtual circuit using an ATM forum user to network interface, UNI; and
  means for setting up and signaling each AAL-2 CID on a call by call basis of a plurality of AAL-2 channels that are in an AAL2 stream within a single virtual channel connection between the network edge device and a network access gateway, individually as a respective VP/VC that is associated with a UNI port of said UNI, wherein during call set-up, each AAL-2 CID is individually set up and signaled as the respective VP/VC within virtual UNI.

13. The network edge device of claim 12 wherein the UNI comprises Q.2931.

14. The network edge device of claim 12 wherein the UNI comprises UNI 4.0.

15. The network edge device of claim 12 wherein the UNI comprises UNI 3.1.

16. The network edge device of claim 12 wherein the receiving means comprises part of a time division multiplexed communication channel to the customer premises equipment.

* * * * *